(12) United States Patent
McCormack et al.

(10) Patent No.: US 10,071,298 B1
(45) Date of Patent: Sep. 11, 2018

(54) WORKOUT APPARATUS FOR SIMULATING USER MOVEMENT PATTERNS IN BICYCLE SPORTS

(71) Applicants: Lee B. McCormack, Boulder, CO (US); Alex Bogusky, Boulder, CO (US)

(72) Inventors: Lee B. McCormack, Boulder, CO (US); Alex Bogusky, Boulder, CO (US)

( * ) Notice: Subject to any disclaimer, the term of this patent is extended or adjusted under 35 U.S.C. 154(b) by 0 days.

(21) Appl. No.: 15/479,130

(22) Filed: Apr. 4, 2017

Related U.S. Application Data

(60) Provisional application No. 62/458,880, filed on Feb. 14, 2017, provisional application No. 62/318,111, filed on Apr. 4, 2016.

(51) Int. Cl.
| | |
|---|---|
| *A63B 21/008* | (2006.01) |
| *A63B 69/16* | (2006.01) |
| *A63B 21/04* | (2006.01) |
| *A63B 21/00* | (2006.01) |

(52) U.S. Cl.
CPC ............ *A63B 69/16* (2013.01); *A63B 21/008* (2013.01); *A63B 21/04* (2013.01); *A63B 21/4035* (2015.10)

(58) Field of Classification Search
CPC ... A63B 69/16; A63B 21/4035; A63B 21/008; A63B 21/04
USPC ....................................... 482/111, 72, 95–96
See application file for complete search history.

(56) References Cited

U.S. PATENT DOCUMENTS

| | | | | | |
|---|---|---|---|---|---|
| 5,178,599 | A | * | 1/1993 | Scott ...................... | A63B 23/00 472/110 |
| 5,533,953 | A | * | 7/1996 | Lui ..................... | A63B 22/0076 482/57 |
| 5,549,527 | A | * | 8/1996 | Yu ..................... | A63B 21/00196 482/57 |
| 5,582,562 | A | * | 12/1996 | Wang ................... | A63B 21/068 482/57 |
| 5,643,147 | A | * | 7/1997 | Huang ................. | A63B 21/068 482/72 |
| 5,672,142 | A | * | 9/1997 | Wu ..................... | A63B 22/0076 482/57 |
| 5,695,434 | A | * | 12/1997 | Dalebout ........... | A63B 21/0083 482/72 |
| 5,695,435 | A | * | 12/1997 | Dalebout ........... | A63B 21/0083 482/57 |
| 5,782,639 | A | * | 7/1998 | Beal .................... | A63B 71/0622 434/29 |

(Continued)

*Primary Examiner* — Andrew S Lo
(74) *Attorney, Agent, or Firm* — Plager Schack LLP; Mark H. Plager

(57) ABSTRACT

A workout apparatus for use by a user to simulate core movement patterns of bike riding is provided. The workout apparatus includes a base deck disposed on a ground surface, a frame assembly pivotably mounted to the base deck and comprising a front portion and a rear portion, a handle bar coupled to the front portion of the frame assembly, and a pair of hydraulic damper units coupled to the frame assembly and base deck, the first hydraulic damper unit coupled to the base deck and front portion of the frame assembly, the second hydraulic damper unit coupled to the base deck and rear portion of the frame assembly. The user on the base deck grabs the handle bar to perform a pushing or pulling motion, thereby enabling the first hydraulic damper unit or second hydraulic damper unit to provide resistance to movement of the frame assembly.

7 Claims, 7 Drawing Sheets

(56) References Cited

U.S. PATENT DOCUMENTS

| | | | | |
|---|---|---|---|---|
| 5,827,158 | A * | 10/1998 | Drecksel | A63B 21/068 482/96 |
| 5,997,446 | A * | 12/1999 | Stearns | A63B 21/00072 482/56 |
| 6,302,832 | B1 * | 10/2001 | Stearns | A63B 21/00072 482/72 |
| 6,872,145 | B1 * | 3/2005 | Boudreaux | A63G 11/00 472/110 |
| 9,375,607 | B1 * | 6/2016 | Rayman | A63B 23/0405 |
| 2005/0085354 | A1 * | 4/2005 | Rice | A63B 22/0012 482/121 |
| 2006/0217238 | A1 * | 9/2006 | Liao | A63B 23/03583 482/72 |
| 2006/0217240 | A1 * | 9/2006 | White | A63B 21/068 482/72 |
| 2008/0134434 | A1 * | 6/2008 | Celauro | A61H 1/02 5/610 |
| 2016/0175645 | A1 * | 6/2016 | Rayman | A63B 23/0405 482/131 |
| 2016/0317863 | A1 * | 11/2016 | Goldberg | A63B 21/0087 |

* cited by examiner

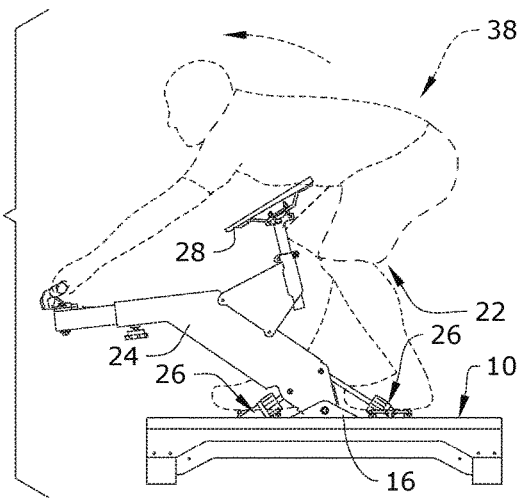
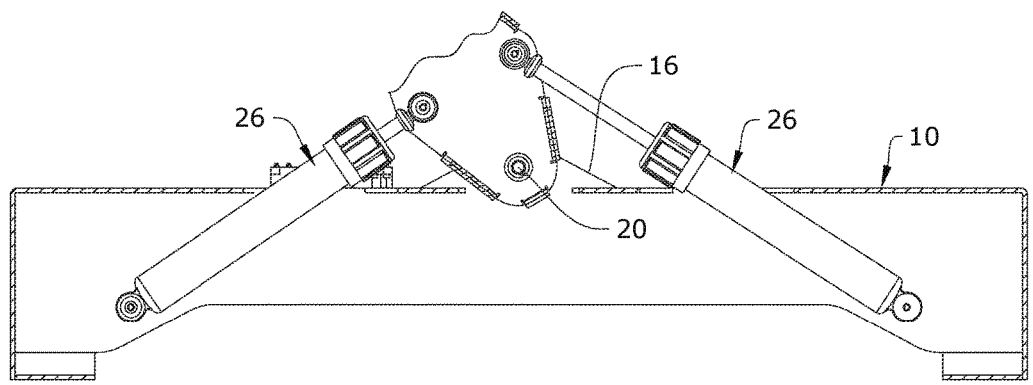

WORKOUT APPARATUS FOR SIMULATING USER MOVEMENT PATTERNS IN BICYCLE SPORTS

RELATED APPLICATION

The application claims priority to provisional patent application U.S. Ser. No. 62/458,880 filed on Feb. 14, 2017, the entire contents of which is herein incorporated by reference. The application claims priority to provisional patent application U.S. Ser. No. 62/318,111 filed on Apr. 4, 2016, the entire contents of which is herein incorporated by reference.

BACKGROUND

The embodiments herein relate generally to bicycle-related sports including, but not limited to, BMX, mountain biking, road cycling, cyclocross and motocross.

BMX, mountain bike and motocross athletes do not have a training device that precisely mimics, practices and/or simulates the movement patterns of their bikes' handlebars relative to the pedals or foot pegs. Currently, athletes train by riding their bicycles or motorcycles in the field and by performing strength exercises that do not exactly re-create the movement patterns of these sports during competitions.

As such, there is a need in the industry for a workout apparatus for simulating user movement patterns in these bicycle sports, which overcomes the limitations of the prior art.

SUMMARY

A workout apparatus for use by a user to simulate core movement patterns of bike riding and enhance strength and fitness of the user is provided. The workout apparatus comprises a base deck disposed on a ground surface, a frame assembly pivotably mounted to the base deck and comprising a front portion and a rear portion opposite the front portion, a handle bar coupled to the front portion of the frame assembly, and a pair of hydraulic damper units coupled to the frame assembly and base deck, the first hydraulic damper unit of the pair of hydraulic damper units coupled to the base deck and front portion of the frame assembly, the second hydraulic damper unit of the pair of hydraulic damper units coupled to the base deck and rear portion of the frame assembly, the first and second hydraulic damper units configured to apply opposing forces on the frame assembly, wherein the user situated on the base deck grabs the handle bar to perform a pushing or pulling motion, thereby enabling the first hydraulic damper unit or second hydraulic damper unit to provide resistance to movement of the frame assembly as the user executes a combination of arm and leg movements.

In an alternative embodiment, the workout apparatus comprises a platform disposed on a ground surface and comprising a front portion and a rear portion opposite the front portion, a lever arm pivotably mounted to the platform and comprising an intermediary attachment point, a front attachment member coupled to the front portion of the platform, a rear attachment member coupled to the rear portion of the platform, and at least one resistance band coupled to either the front attachment member and intermediary attachment point of the lever arm or the rear attachment member and intermediary attachment point of the lever arm.

BRIEF DESCRIPTION OF THE FIGURES

The detailed description of some embodiments of the invention will be made below with reference to the accompanying figures, wherein the figures disclose one or more embodiments of the present invention.

FIG. 6 depicts a side view of certain embodiments of the workout apparatus shown in use in an exemplary alternate configuration;

FIG. 7 depicts a section view of certain embodiments of the workout apparatus shown in an exemplary alternate configuration;

DETAILED DESCRIPTION OF CERTAIN EMBODIMENTS

Figure 1:
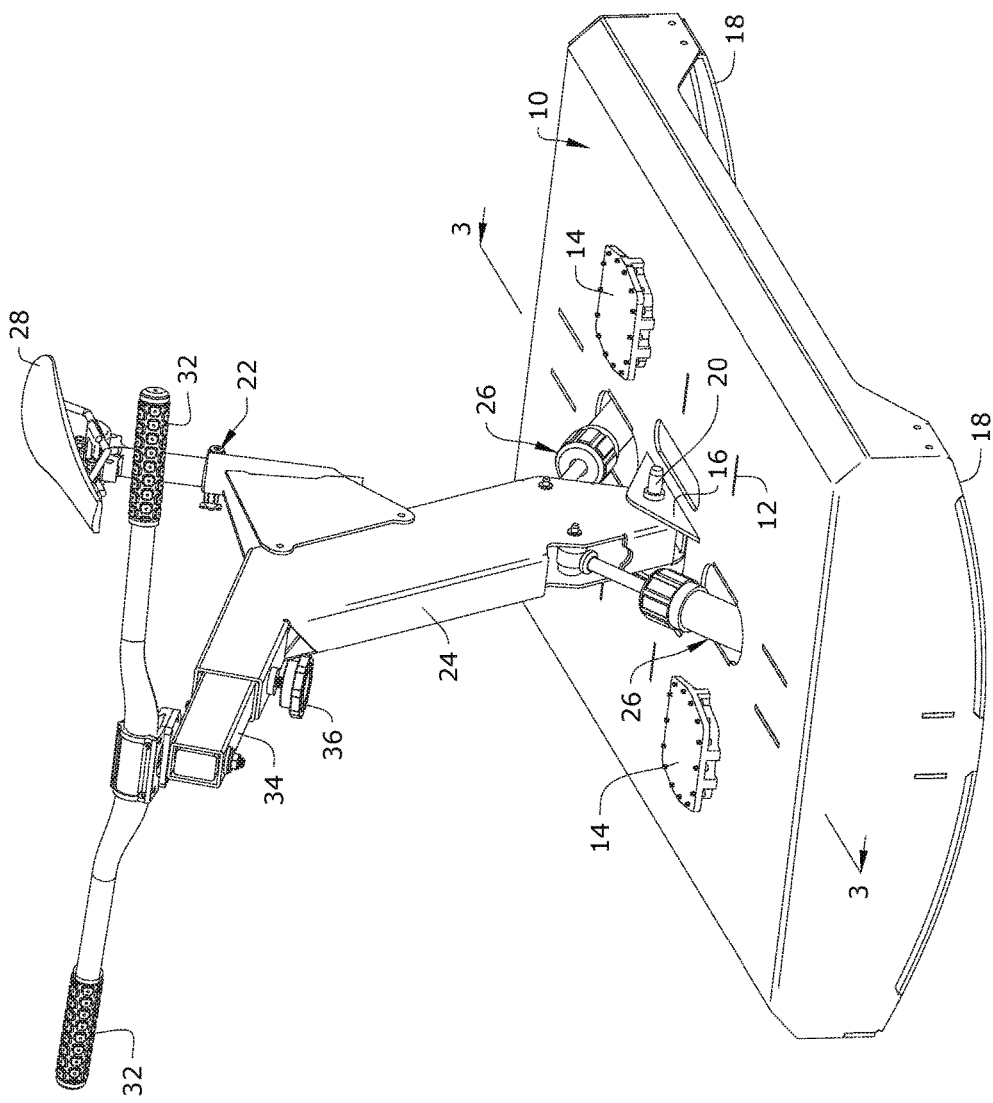
FIG. 1 depicts a perspective view of certain embodiments of the workout apparatus.

As depicted in FIGS. 1-10, the workout apparatus is configured for use by operator 38 to simulate core movement patterns of BMX, mountain bike, road bicycle, cyclocross and motocross riding. In addition, the workout apparatus is beneficial in permitting operator 38 to perform a variety of exercise movements to improve general strength and fitness. In certain embodiments, the workout apparatus generally comprises base deck 10, frame 24, hydraulic damping units 26, seat 28 and handle bar 32.

Base deck 10 is preferably made from aluminum sheets coupled together and is configured to be disposed on ground 40. However, base deck 10 may be made from other materials such as wood, plastic, other metals, and the like. The members of base deck 10 may be welded together or coupled together using mechanical fasteners.

Figure 9:
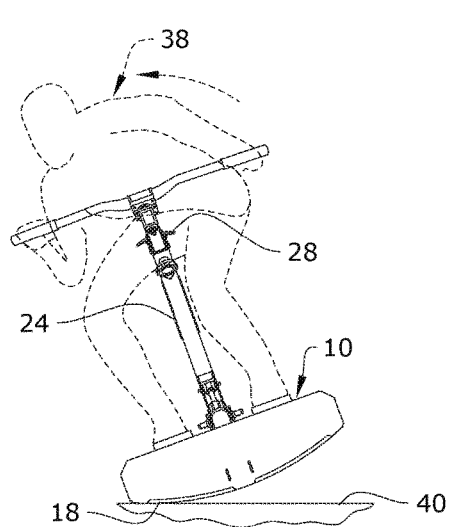
FIG. 9 depicts a front view of certain embodiments of the workout apparatus shown in use in an exemplary alternate configuration.
Figure 10:
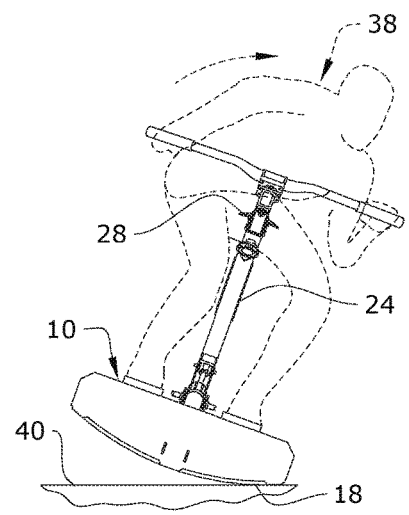
FIG. 10 depicts a front view of certain embodiments of the workout apparatus shown in use in an exemplary alternate configuration.

In one embodiment, base deck 10 comprises a pair of convex support members 18 on front and rear portions of the base deck. Convex support members 18 contact ground 40 and permit base deck 10 to tilt laterally as shown in FIGS. 9-10. In one embodiment, one or more protective strips are coupled to the bottom of convex support members 18 to protect base deck 10 and/or ground 40 from damage. The protective strips may be made from any suitable material such as rubber or alternative grip material.

A plurality of deck slots 12 are disposed through the top surface of base deck 10. Each deck slot 12 is configured to receive foot platform 14. Foot platforms 14 can easily slide in and out of deck slots 12 to permit operator 38 to set the desired positioning of foot platforms 14. Foot platforms 14 are preferably made from plastic, but could be made from metal, wood, cork or other materials. Foot platforms 14 improve grip between the feet of operator 38 and base deck 10, and are designed to mimic foot pedals of a bike, footpegs on a motorcycle or stirrups of a horse.

Frame 24 is pivotably mounted to base deck 10 and is preferably made from metal sheets coupled together. In one embodiment, frame 24 is made from aluminum. However, other metals or materials may be used instead. In one embodiment, a pair of raised brackets 16 are coupled to base deck 10 and arranged generally parallel to one another. The bottom portion of frame 24 is pivotably mounted to raised brackets 16 by main pivot components 20. In one embodiment, main pivot components 20 comprise any number of components including, but not limited to, bushings, quick release pins and/or bearings. Main pivot components 20 permit frame 24 to pivot in a forward and backward motion. The quick release pins of main pivot components 20 permit frame 24 to easily attach and detach from base deck 10.

Figure 3:
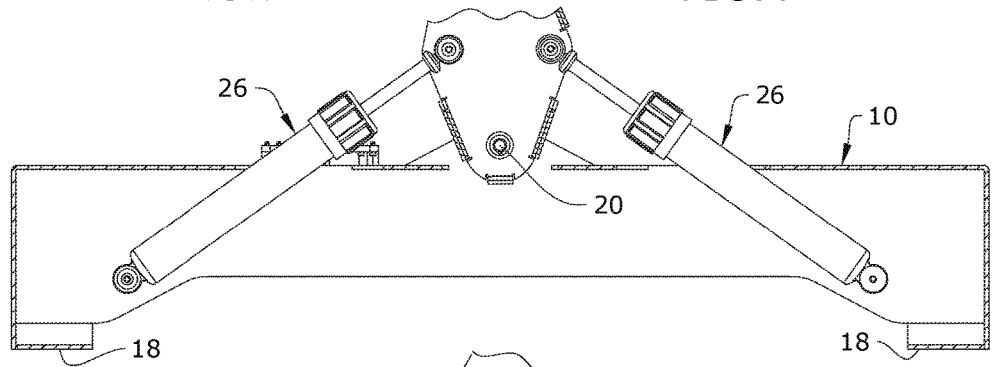
FIG. 3 depicts a section view of certain embodiments of the workout apparatus taken along line 3-3 in FIG. 1.
Figure 5:
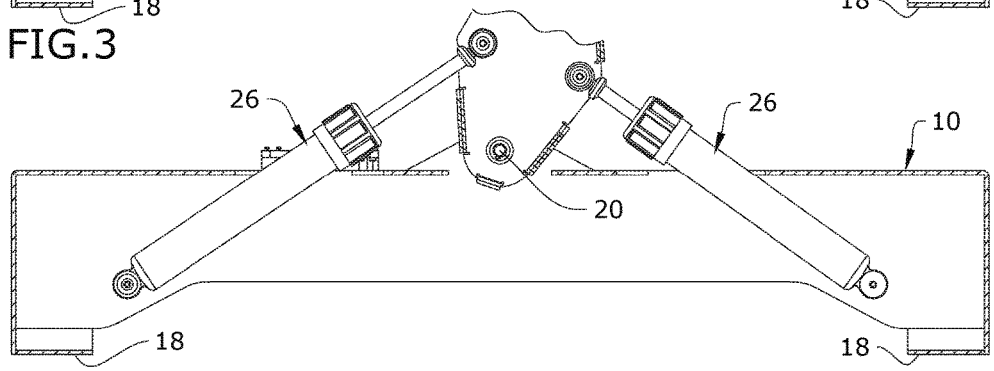
FIG. 5 depicts a section view of certain embodiments of the workout apparatus shown in an exemplary alternate configuration.

A pair of hydraulic damping units 26 are coupled to both frame 24 and base deck 10 by mechanical fasteners. As depicted in FIGS. 1 and 3, hydraulic damping units 26 are positioned to apply opposing forces on frame 24. Specifically, a first hydraulic damping unit 26 is coupled to both base deck 10 and a front portion of frame 24 and a second hydraulic damping unit 26 is coupled to both base deck 10 and a rear portion of frame 24. In this secured position, each hydraulic damping unit 26 extends through an opening in the top surface of base deck 10. The hydraulic damping units 26 are configured to apply a resistance force against frame 24 in response to pivotal movement of the frame in the forward or backward directions. Each hydraulic damping unit 26 can be independently adjusted via a dial to vary the generated force within the approximate range of 100-4,000 Newtons. FIGS. 3, 5, and 7 depict hydraulic damping units 26 in various positions during the pivotal movement of frame 24.

Figure 11:
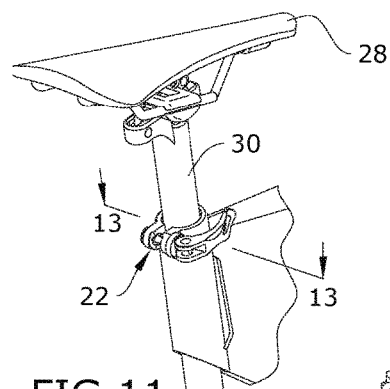
FIG. 11 depicts a perspective view of certain embodiments of the workout apparatus.
Figure 12:
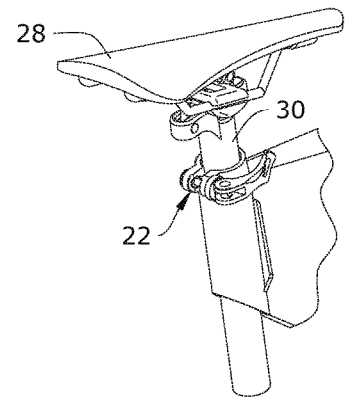
FIG. 12 depicts a perspective view of certain embodiments of the workout apparatus.
Figure 13:
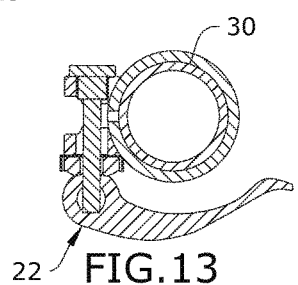
FIG. 13 depicts a section view of certain embodiments of the workout apparatus taken along line 13-13 in FIG. 11.

In one embodiment, seat 28 is slidably adjusted to a rear portion of frame 24. As depicted in FIGS. 11-13, seat 28 is coupled to seat post 30, which is inserted within a tubular opening in frame 24. Seat post 30 slides up and down relative to frame 24 and is locked into place by cam lock 22. This permits seat 28 to be adjusted to one of a plurality of height positions. It shall be appreciated that the workout apparatus can be used entirely without the seat assembly components including seat 28, seat post 30 and cam lock 22. This permits operator 38 to use the workout apparatus with the seat assembly to mimic bike/motorcycle riding or the workout apparatus without the seat assembly for general fitness exercises.

Figure 14:
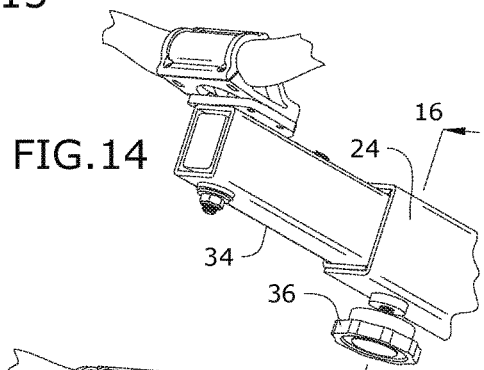
FIG. 14 depicts a perspective view of certain embodiments of the workout apparatus.
Figure 16:
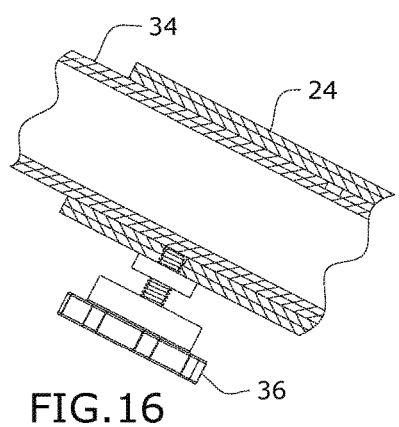
FIG. 16 depicts a section view of certain embodiments of the workout apparatus taken along line 16-16 in FIG. 14.
Figure 15:
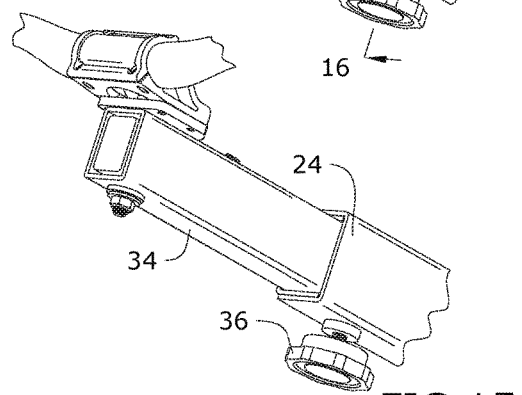
FIG. 15 depicts a perspective view of certain embodiments of the workout apparatus.

Handle bar 32 is slidably mounted to the front portion of frame 24 and comprises grips on opposing ends. As depicted in FIGS. 14-16, handle bar 32 is coupled to inner tube 34 by mechanical fasteners. Inner tube 34 slidably adjusts within an outer tubular member of frame 24 to adjust the distance of handle bar 32 relative to frame 24. Once handle bar 32 is in the desired position, knob 36 is rotatably adjusted to contact inner tube 34 as depicted in FIG. 16. This locks inner tube 34 in place to frame 24 to set the overall length of the workout apparatus. In one embodiment, handle bar 32 is configured to rotate relative to inner tube 34 by bearings (not shown). This allows handle bar 32 to rotate like a bike/motorcycle or be locked in place by a pin. It shall be appreciated that the adjustments of both seat 28 and handle bar 32 easily permit the workout apparatus to adjust to mimic different sized bikes to accommodate operator 38. This allows the workout apparatus to accommodate riders of different sizes and proportions.

In operation, the workout apparatus is configured to accommodate operator 38. Foot platforms 14 are disposed in the desired deck slots 12. Handle bar 32, inner tube 34 and seat 28 are adjusted to the desired positions as previously described. Handle bar 32 is locked in place or set to rotate relative to inner tube 34. Operator 38 selects the desired level of resistance on hydraulic damper units 26. Hydraulic damper units 26 can be set to the same or different resistance levels from each other. The rear damper unit provides resistance in the pushing forward direction of frame 24. The front damper unit provides resistance in the pulling backward direction of frame 24.

Figure 2:
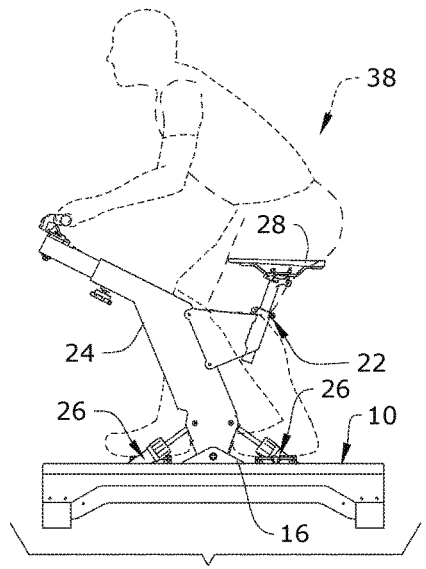
FIG. 2 depicts a side view of certain embodiments of the workout apparatus in use in a static exemplary initial configuration.
Figure 4:
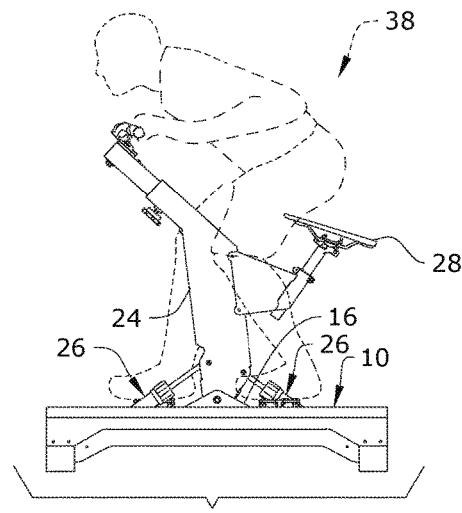
FIG. 4 depicts a side view of certain embodiments of the workout apparatus shown in use in an exemplary alternate configuration.
Figure 8:
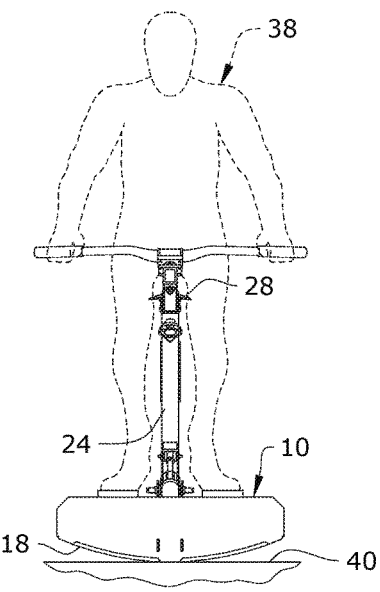
FIG. 8 depicts a front view of certain embodiments of the workout apparatus shown in use in an exemplary static initial configuration.

Operator 38 stands on base deck 10 and places his/her feet on foot platforms 14. Operator 38 straddles frame 24 in the same manner as on a bike. The shape of convex support members 18 require operator 38 to balance his/her weight evenly between the feet. Operator 38 pulls and pushes handle bar 32 back and forth while executing a hip hinge and hip drive motion. At the same time, operator 38 executes a combination of arm and leg movements. During this time, seat 28 moves back and forth between the legs of operator 38. These movements precisely mimic the motions of riding a bike or motorcycle on rough terrain. FIGS. 2, 4 and 6 depict the movements of operator 38 and the workout apparatus. FIGS. 9-10 depict the lateral tilt of the workout apparatus when in use. This helps operator 38 to train for turns when riding a bike. The shape of convex support members 18 on ground 40 also provides feedback to operator 38 as to whether the weight of his/her body is balanced. In a balanced state, the top surface of base deck 10 remains parallel to ground 40 as shown in FIG. 8. If the weight of operator 38 is not balanced, the workout apparatus tilts laterally.

Figure 17:
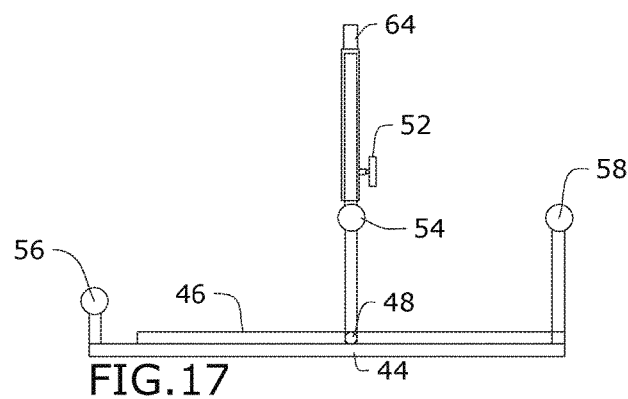
FIG. 17 depicts a side view of an alternative embodiment of the workout apparatus.
Figure 19:
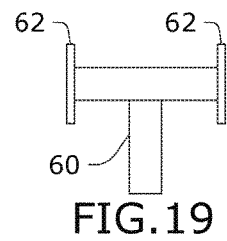
FIG. 19 depicts a front view of certain embodiments of an alternative embodiment of the workout apparatus.
Figure 18:
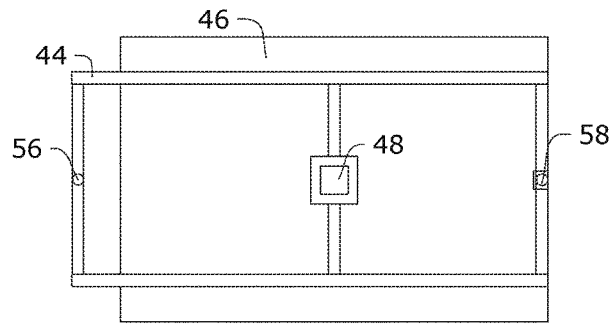
FIG. 18 depicts a top view of an alternative embodiment of the workout apparatus.
Figure 20:
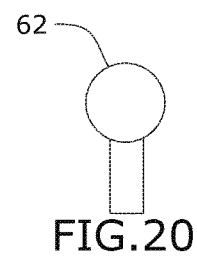
FIG. 20 depicts a side view of certain embodiments of an alternative embodiment of the workout apparatus.

The workout apparatus may comprise several alternative designs as depicted in FIGS. 17-27. As depicted in FIGS. 17-18, an alternative workout apparatus comprises frame 44 coupled to platform 46. Frame 44 comprises front attachment point member 56 and rear attachment point member 58. Lever arm 64 is pivotably mounted to frame 44 at main pivot 48, which comprises one or more bearings. Lever arm 64 comprises intermediary attachment point 54. In one embodiment, the height of lever arm 64 can be adjusted by telescoping members, which are locked in place by bolt 52. In one embodiment, a bike handle bar (not shown) is coupled to the top of lever arm 64. FIGS. 19-20 depict an exemplary intermediary attachment point member 60, which is coupled to intermediary attachment point 54 on lever arm 64. Intermediary attachment point member 60 comprises a pair of oppositely oriented flanges 62.

In operation, one or more resistance bands (not shown) are attached to front attachment point member 56 and intermediary attachment point member 60 and/or rear attachment point member 58 and intermediary attachment point member 60. Operator 38 stands on platform 46 and performs a pulling and pushing motion on lever arm 64. The one or more resistance bands provide resistance to the movement of lever arm 64. Specifically, a resistance band connected to front attachment point member 56 and intermediary attachment point member 60 provides a pulling resistance. A resistance band connected to rear attachment point member 58 and intermediary attachment point member 60 provides a pushing resistance.

Figure 21:
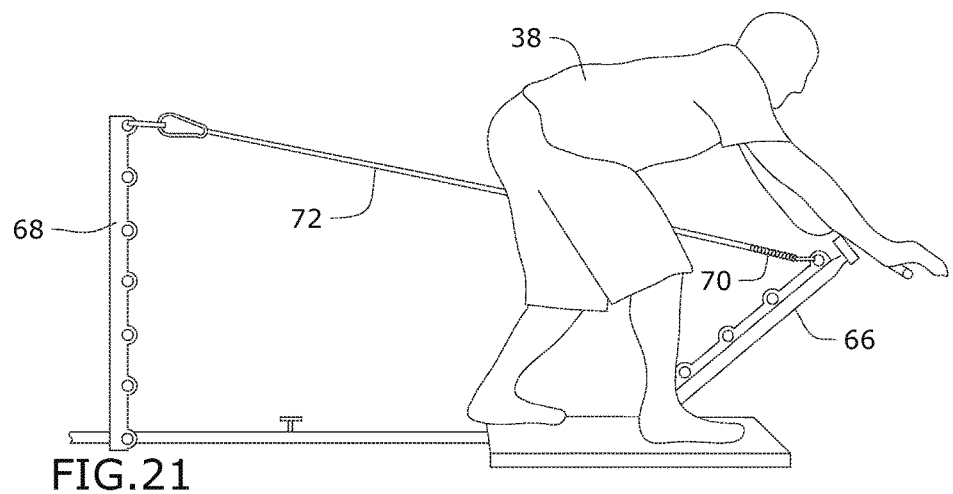
FIG. 21 depicts a side view of an alternative embodiment of the workout apparatus.

FIG. 21 depicts an alternative workout apparatus comprising alternate rear attachment point member 68, spring 70, elastic resistance band 72 and lever arm 66. Lever arm 66 and alternate rear attachment point member 68 both comprise a plurality of eyelets positioned at different height locations. This permits elastic resistance band 72 to be attached to lever arm 66 and alternate rear attachment point member 68 at different heights to vary the workout performed by operator 38. Elastic resistance band 72 and spring 70 may be coupled to alternate rear attachment point member 68 and lever arm 66 by any fastening components such as clips, carabiners, or the like.

In one exemplary embodiment, operator 38 performs pushing motions on lever arm 66 when facing away from alternate rear attachment point member 68 and elastic resistance band 72 is coupled to an upper eyelet of rear alternate rear attachment point member 68. In one exemplary embodiment, operator 38 performs pulling motions on lever arm 66 when facing toward alternate rear attachment point member 68 and elastic resistance band 72 is coupled to a lower eyelet of alternate rear attachment point member 68.

Figure 22:
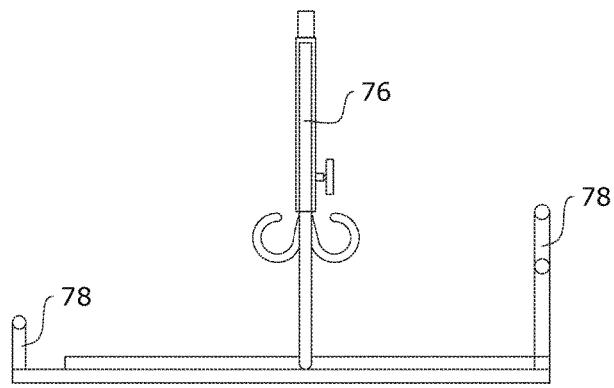
FIG. 22 depicts a side view of an alternative embodiment of the workout apparatus.
Figure 23:
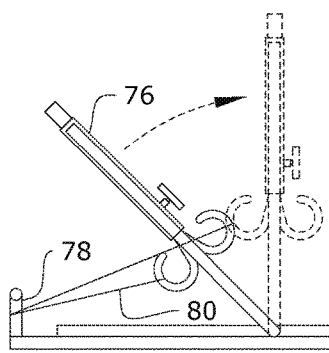
FIG. 23 depicts a side view of an alternative embodiment of the workout apparatus.
Figure 24:
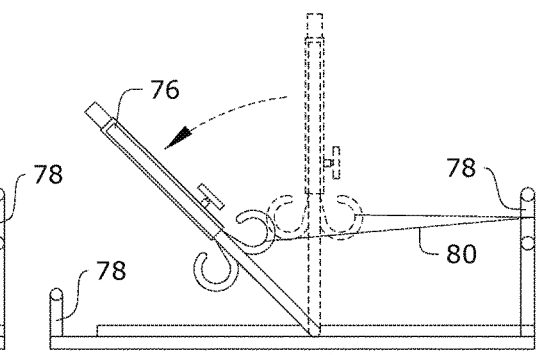
FIG. 24 depicts a side view of an alternative embodiment of the workout apparatus.

FIGS. 22-24 depict an alternative workout apparatus comprising main lever arm 76 and alternate attachment point members 78. In one embodiment, main lever arm 76 comprises hooks. Elastic resistance band 80 can be secured to either alternate attachment point member 78 or main lever arm 76. As depicted in FIGS. 23-24, elastic resistance band 80 provides resistance to main lever arm 76 as it pivots backward and forward.

Figure 25:
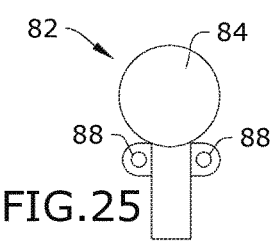
FIG. 25 depicts a side view of certain embodiments of an alternative embodiment of the workout apparatus.
Figure 26:
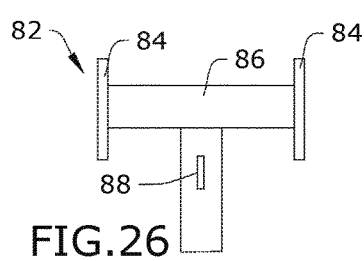
FIG. 26 depicts a front view of certain embodiments of an alternative embodiment of the workout apparatus.

FIGS. 25-26 depict alternate intermediary attachment point member 82, which comprises flanges 84, crossbar 86 and eyelets 88. Alternate intermediary attachment point member 82 can be coupled to any intermediary attachment point on any lever arm previously mentioned. Eyelets 88 provide fastening locations to secure a clip or carabiner when securing an elastic band to the lever arm or attaching a damping unit thereon using a bolt.

Figure 27:
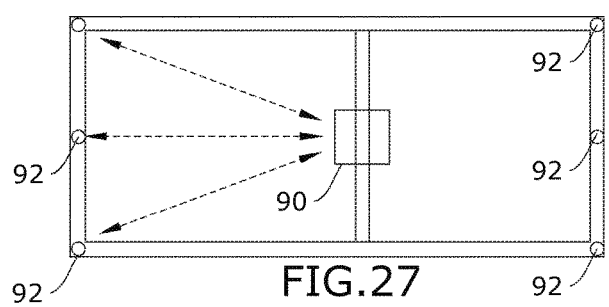
FIG. 27 depicts a top view of an alternative embodiment of the workout apparatus.

It shall be appreciated that elastic resistance bands may be attached to different locations of the outer frame of the workout apparatus. FIG. 27 depicts an alternative workout apparatus comprising alternate attachment point members 92 disposed along different locations on the outer frame. In this embodiment, elastic resistance bands can be attached to various positions between alternate attachment point members 92 and a lever arm (not shown) coupled to main pivot 90. In one embodiment, main pivot 90 is a multi-directional pivot that permits the lever arm to move in multiple directions. These variations provide operator 38 with a different workout stimulus that varies the direction of body and/or lever arm movements when performing exercises.

It shall be appreciated that the components of the workout apparatuses described in several embodiments herein may comprise any alternative known materials in the field and be of any color, size and/or dimensions. It shall be appreciated that the components of the workout apparatuses described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A workout apparatus for use by a user to simulate core movement patterns of bike riding and enhance strength and fitness of the user, the workout apparatus comprising:
   a base deck disposed on a ground surface;
   a frame assembly pivotably mounted to the base deck and comprising a front portion and a rear portion opposite the front portion;
   a handle bar coupled to the front portion of the frame assembly; and
   a pair of hydraulic damper units coupled to the frame assembly and base deck, the first hydraulic damper unit of the pair of hydraulic damper units coupled to the base deck and front portion of the frame assembly, the second hydraulic damper unit of the pair of hydraulic damper units coupled to the base deck and rear portion of the frame assembly, the first and second hydraulic damper units configured to apply opposing forces on the frame assembly;
   wherein when the user is situated on the base deck and grabs the handle bar to perform a pushing or pulling motion, the first hydraulic damper unit or second hydraulic damper unit is enabled to provide resistance to movement of the frame assembly as the user executes a combination of arm and leg movements.

2. The workout apparatus of claim 1, further comprising a pair of foot platforms detachably coupled to a top surface of the base deck.

3. The workout apparatus of claim 2, wherein the top surface of the base deck comprises a plurality of slots, each foot platform of the pair of foot platforms configured to detachably couple to any one of the plurality of slots in the base deck.

4. The workout apparatus of claim 3, further comprising a first convex support member coupled to a front portion of the base deck and a second convex support member coupled to a rear portion of the base deck, the first and second convex support members configured to contact the ground surface to permit the base deck to tilt laterally.

5. The workout apparatus of claim 4, wherein the handle bar is coupled to an inner tube slidably mounted to the front portion of the frame assembly.

6. The workout apparatus of claim 5, further comprising a knob member detachably coupled to the inner tube and front portion of the frame assembly, the knob member configured to prevent movement of the inner tube relative to the frame assembly when in contact with the inner tube.

7. The workout apparatus of claim 6, further comprising a seat slidably mounted to the rear portion of the frame assembly and configured to adjust to one of a plurality of height positions.

* * * * *